US009824596B2

(12) United States Patent
Arbeit et al.

(10) Patent No.: US 9,824,596 B2
(45) Date of Patent: Nov. 21, 2017

(54) UNMANNED VEHICLE SEARCHES

(71) Applicants: Insitu, Inc., Bingen, WA (US);
University of Washington through its Center for Commercialization, Seattle, WA (US)

(72) Inventors: Amy Claire Arbeit, White Salmon, WA (US); Christopher W. Lum, Bainbridge Island, WA (US)

(73) Assignees: INSITU, INC., Bingen, WA (US); UNIVERSITY OF WASHINGTON THROUGH ITS CENTER FOR COMMERCIALIZATION, Seattle, WA (US)

( * ) Notice: Subject to any disclaimer, the term of this patent is extended or adjusted under 35 U.S.C. 154(b) by 403 days.

(21) Appl. No.: 14/453,406

(22) Filed: Aug. 6, 2014

(65) Prior Publication Data

US 2015/0066248 A1    Mar. 5, 2015

Related U.S. Application Data

(60) Provisional application No. 61/872,340, filed on Aug. 30, 2013.

(51) Int. Cl.
*G08G 5/00* (2006.01)
*G01C 21/20* (2006.01)
(Continued)

(52) U.S. Cl.
CPC .......... *G08G 5/0069* (2013.01); *G01C 21/20* (2013.01); *G01C 23/00* (2013.01); *G05D 1/0094* (2013.01);
(Continued)

(58) Field of Classification Search
CPC combination set(s) only.
See application file for complete search history.

(56) References Cited

U.S. PATENT DOCUMENTS 8,368,584 B2 *   2/2013   Askelson ................ G01S 7/003
                                                            342/179
8,370,057 B1     2/2013   Herwitz
(Continued)

FOREIGN PATENT DOCUMENTS

EP           2147858 A2 *   1/2010   ............. B64C 27/20

OTHER PUBLICATIONS

Myungsoo, Jun and Raffaello, D'Andrea, Chapter 6 "Path Planning for Unmanned Aerial Vehicle in Uncertain and Adversal Environment" in the book titled "Cooperative control : models, applications and algorithms", • Dordrecht ; London : Kluwer Academic Publishers, c2003, v. 1, pp. 95-111.*

(Continued)

*Primary Examiner* — Thomas G Black
*Assistant Examiner* — Ana Thomas
(74) *Attorney, Agent, or Firm* — Gates & Cooper LLP

(57) ABSTRACT

A method of planning a flight path for a search can include receiving, by a control system, an indication of a search area boundary; receiving, by the control system, an indication of a selected search pattern; determining, by the control system, a flight path based on the search area boundary and the selected search pattern; and transmitting one or more indications of the flight path to an unmanned aerial vehicle.

19 Claims, 17 Drawing Sheets

(51) Int. Cl.
*G01C 23/00* (2006.01)
*G05D 1/00* (2006.01)
*G05D 1/02* (2006.01)
*B64C 39/02* (2006.01)

(52) U.S. Cl.
CPC ........... *G05D 1/0202* (2013.01); *G08G 5/006* (2013.01); *G08G 5/0013* (2013.01); *G08G 5/0026* (2013.01); *G08G 5/0034* (2013.01); *G08G 5/0039* (2013.01); *B64C 39/024* (2013.01); *B64C 2201/127* (2013.01); *B64C 2201/14* (2013.01); *G08G 5/0021* (2013.01)

(56) References Cited

U.S. PATENT DOCUMENTS

| | | | | |
|---|---|---|---|---|
| 8,718,838 B2* | 5/2014 | Kokkeby | ............... | G01S 3/7864 701/3 |
| 8,744,737 B2* | 6/2014 | D'Angelo | ............ | G08G 5/0008 701/120 |
| 2006/0015215 A1* | 1/2006 | Howard | ............... | G05D 1/0094 700/245 |
| 2007/0210953 A1* | 9/2007 | Abraham | ............... | G08G 5/045 342/29 |
| 2009/0027253 A1* | 1/2009 | van Tooren | ......... | G01S 13/9303 342/29 |
| 2009/0157233 A1* | 6/2009 | Kokkeby | ............... | G01S 3/7864 701/3 |
| 2009/0210109 A1* | 8/2009 | Ravenscroft | ......... | G01C 21/005 701/26 |
| 2010/0084513 A1* | 4/2010 | Gariepy | ................ | B64C 39/024 244/190 |
| 2010/0131121 A1* | 5/2010 | Gerlock | ............... | G08G 5/0013 701/2 |
| 2010/0292873 A1 | 11/2010 | Duggan et al. | | |
| 2012/0065881 A1* | 3/2012 | McIver | .................. | G01C 23/00 701/467 |
| 2014/0081505 A1* | 3/2014 | Klinger | ................. | G08G 1/162 701/25 |
| 2016/0272333 A1* | 9/2016 | Heinonen | ............. | B64C 39/024 |
| 2016/0320165 A1* | 11/2016 | Rovinsky | ................ | F42B 12/22 |
| 2017/0041587 A1* | 2/2017 | Wei | ....................... | B64C 39/024 |
| 2017/0146990 A1* | 5/2017 | Wang | .................. | G05D 1/0011 |

OTHER PUBLICATIONS

International Patent Application No. PCT/US2014/053365; Int'l Preliminary Report on Patentability; dated Mar. 10, 2016; 9 pages.
Bae ; "Target Searching Method in the Chaotic UAV"; Digital Avionics Systems Conference; 2004 IEEE; p. 12.D.8-1 thru 8-9.
International Patent Application No. PCT/US2014/053365; Int'l Search Report and the Written Opinion; dated May 13, 2015; 13 pages.

* cited by examiner

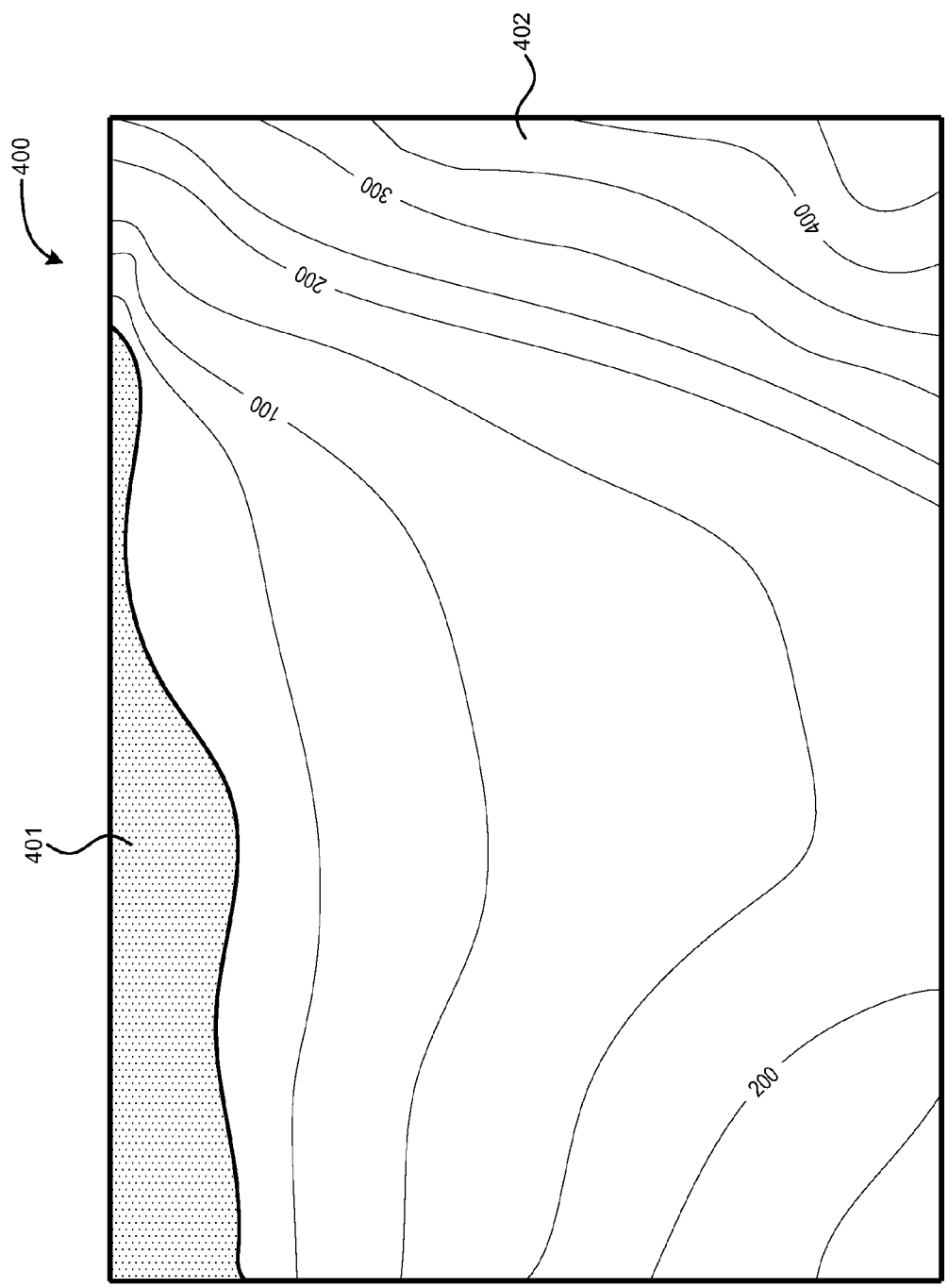

UNMANNED VEHICLE SEARCHES

CROSS REFERENCE TO RELATED APPLICATIONS

The present application claims the benefit of U.S. Provisional Patent Application 61/872,340, filed Aug. 30, 2013, the contents of which are hereby incorporated by reference in their entirety.

BACKGROUND

The present application is generally related to the use of unmanned aerial vehicles (UAVs) in search efforts.

UAVs can be useful in a number of settings. Searching efforts for potential targets are some of the settings in which UAVs can be useful. Searches can be made in search-and-rescue efforts can include searches for potential targets, such as lost hikers, downed pilots, lost vehicles, disabled boats, lifeboats, and many other possible potential targets that could benefit from rescue. Other search efforts can include reconnaissance searches (such as in a military setting), searches for physical items (such as portions of downed aircraft or spacecraft), and the like.

UAV control typically includes a controller operating at a control system. The control system accepts inputs from the controller and transmits information wirelessly to a UAV in flight. The UAV can respond to the signals sent by the control system to change operation of the UAV, such as by changing a flight path, changing an elevation, releasing payload (e.g., a weapon), changing operation of payload (e.g., a camera or sensor), and the like. Control of a UAV can be difficult, just as control of a manned air vehicle can be difficult for a pilot. When additional tasks and responsibilities are placed on a UAV controller, such as controlling a search by the UAV, control of the UAV can become even more difficult.

SUMMARY

Illustrative examples of the present disclosure include, without limitation, methods, structures, and systems. In one aspect, a method of planning a flight path for a search can include receiving, by a control system, an indication of a search area boundary; receiving, by the control system, an indication of a selected search pattern; determining, by the control system, a flight path based on the search area boundary and the selected search pattern; and transmitting one or more indications of the flight path to an unmanned aerial vehicle.

In one example, the selected search pattern comprises at least one of a trackline search pattern, a parallel search pattern, a creeping line search pattern, an expanding square search pattern, and a sector search pattern. The method could also include receiving a pattern direction where determining the flight path comprises determining the flight path based further on the pattern direction. The method could also include displaying the flight path on a display of a map. An update of one or more of the selected search pattern or a track spacing of the selected search pattern may be received by the control system. When an update is received of one or more of the selected search pattern or track spacing of the selected search pattern, the displayed flight path on the display of the map can be updated.

In another aspect, a system for displaying target search probabilities can include a control unit, a sensor mounted on an air vehicle, and a camera mounted on the air vehicle. The control unit can be configured to determine, based on an optimization algorithm, a search area to be searched. The sensor can be configured to determine a direction and a distance to the search area. The camera can be configured to take one or more images of the search area. The control unit can also be configured to receive, from the sensor, an indication of the direction and the distance to the search area, and control an orientation and a zoom of the camera based on the indication of the direction and the distance to the search area received from the sensor.

In one example, the system can further include a display configured to display a plurality of search regions and to display, in one or more of the plurality of search regions, an indication of a likelihood that a search target is located in each of the one or more of the plurality of search regions. In another example, the indication of the likelihood that the search target is located in each of the one or more of the plurality of search regions can include one or more of a shading of the one or more of the plurality of search regions, a color of the one or more of the plurality of search regions, and a numerical indicator in the one or more of the plurality of search regions. In another example, the likelihood that the search target is located in each of the one or more of the plurality of search regions can be calculated based on one or more of information about the terrain of the one or more of the plurality of search regions, information about conditions during a search of the one or more of the plurality of search regions, and information about the search target.

In another aspect, a method of planning a flight path for a search can include receiving, by a control system, an indication of a search area boundary; receiving, by the control system, an indication of a selected search pattern; identifying a no-fly zone, wherein at least a portion of the no-fly zone overlaps at least a portion of the search area boundary; determining, by the control system, a flight path based on the search area boundary, the selected search pattern, the no-fly zone, and at least one specification of an unmanned aerial vehicle; and transmitting one or more indications of the flight path to the unmanned aerial vehicle.

In one example, the method can also include displaying the flight path on a display of a map. The no-fly zone can be defined as any type of polygon or any other shape. The flight path can be determined such that the unmanned aerial vehicle searches portions of the search area boundary that are outside of the no-fly zone. The specification of the unmanned aerial vehicle can include a minimum turn radius. The control system can be configured to automatically determine the flight path. The control system can be further configured to automatically determine the flight path at least partially simultaneously while a controller of the unmanned aerial vehicle is controlling another aspect of the unmanned aerial vehicle.

In another aspect, a system can include an unmanned aerial vehicle, a slewing mechanism mounted on the unmanned aerial vehicle, a control unit, and a camera mounted on the slewing mechanism. The control unit can be configured determine an area to be searched based on an optimization algorithm and to control the slewing mechanism based on the determination of the area to be searched. The camera can be configured to take one or more images of the area to be searched.

Other features of the methods, structures, and systems are described below. The features, functions, and advantages can be achieved independently in various examples or may be combined in yet other examples, further details of which can be seen with reference to the following description and drawings.

BRIEF DESCRIPTION OF THE DRAWINGS

Throughout the drawings, reference numbers may be re-used to indicate correspondence between referenced elements. The drawings are provided to illustrate examples described herein and are not intended to limit the scope of the disclosure.

FIGS. 4A-4F depict an example of steps of generating a search flight path for a UAV.

DETAILED DESCRIPTION

Figure 1:
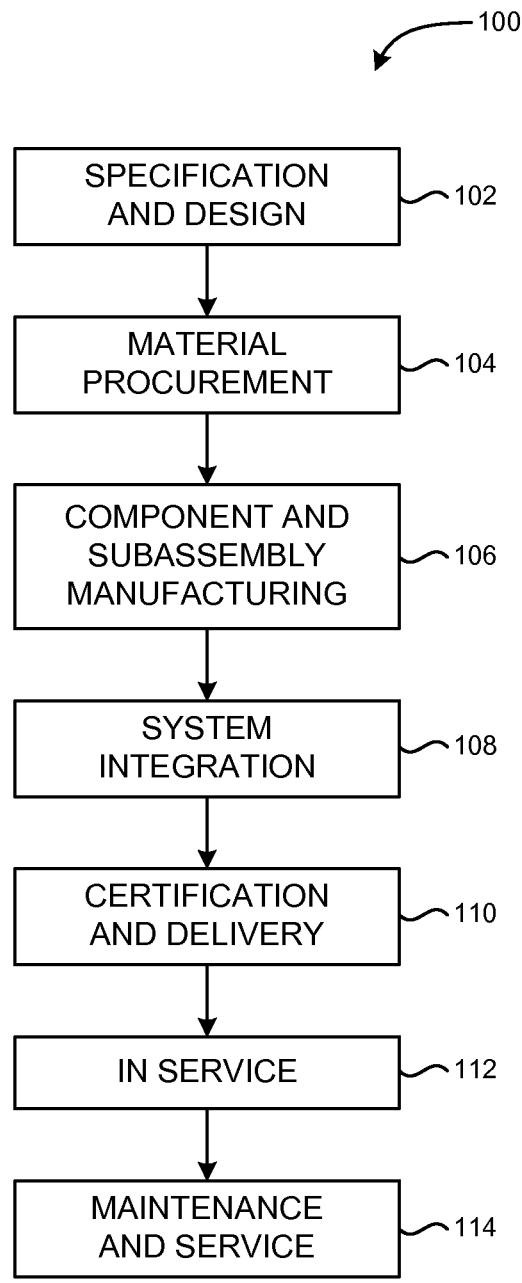
FIG. 1 depicts a flow diagram of an aircraft production and service methodology.
Figure 2:
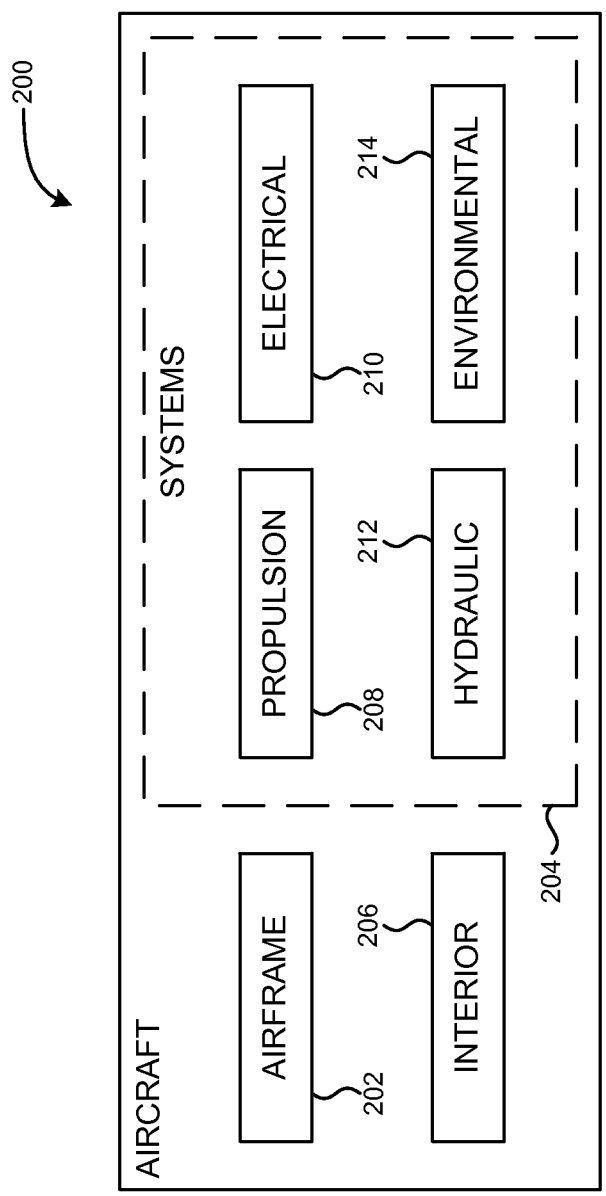
FIG. 2 depicts a block diagram of an aircraft.

Examples in this disclosure may be described in the context of aircraft manufacturing and service method 100 as shown in FIG. 1 and an aircraft 200 as shown in FIG. 2. During pre-production, aircraft manufacturing and service method 100 may include specification and design 102 of aircraft 200 and material procurement 104.

During production, component and subassembly manufacturing 106 and system integration 108 of aircraft 200 takes place. Thereafter, aircraft 200 may go through certification and delivery 110 in order to be placed in service 112. While in service by a customer, aircraft 200 is scheduled for routine maintenance and service 114 (which may also include modification, reconfiguration, refurbishment, and so on).

Each of the processes of aircraft manufacturing and service method 100 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of venders, subcontractors, and suppliers; and an operator may be an airline, leasing company, military entity, service organization, and so on.

As shown in FIG. 2, aircraft 200 produced by aircraft manufacturing and service method 100 may include airframe 202 with a plurality of systems 204 and interior 206. Examples of systems 204 include one or more of propulsion system 208, electrical system 210, hydraulic system 212, and environmental system 214. Any number of other systems may be included in this example. Although an aerospace example is shown, the principles of the disclosure may be applied to other industries, such as the automotive industry.

Apparatus and methods embodied herein may be employed during any one or more of the stages of aircraft manufacturing and service method 100. For example, without limitation, components or subassemblies corresponding to component and subassembly manufacturing 106 may be fabricated or manufactured in a manner similar to components or subassemblies produced while aircraft 200 is in service.

Figure 3:
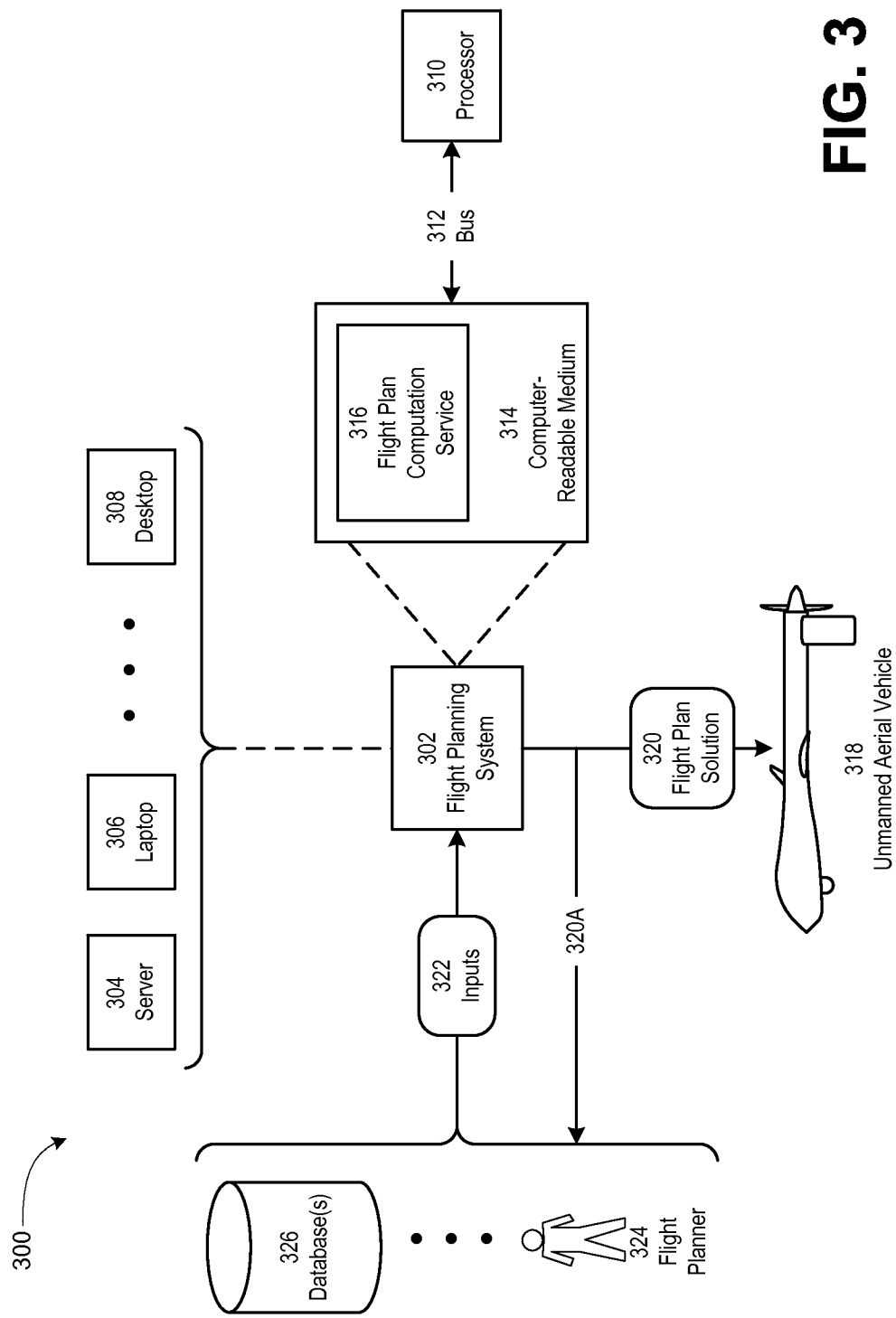
FIG. 3 depicts a block diagram illustrating systems or operating environments for controlling unmanned aerial vehicles (UAVs).

FIG. 3 illustrates systems or operating environments, denoted generally at 300, that provide flight plans for UAVs while routing around obstacles having spatial and temporal dimensions. These systems 300 may include one or more flight planning systems 302. FIG. 3 illustrates several examples of platforms that may host the flight planning system 302. These examples may include one or more server-based systems 304, one or more portable computing systems 306 (whether characterized as a laptop, notebook, tablet, or other type of mobile computing system), and/or one or more desktop computing systems 308. As detailed elsewhere herein, the flight planning system 302 may be a ground-based system that performs pre-flight planning and route analysis for the UAVs, or may be a vehicle-based system that is housed within the UAVs themselves.

Implementations of this description may include other types of platforms as well, with FIG. 3 providing non-limiting examples. For example, the description herein contemplates other platforms for implementing the flight planning systems, including but not limited to wireless personal digital assistants, smartphones, or the like. The graphical elements used in FIG. 3 to depict various components are chosen only to facilitate illustration, and not to limit possible implementations of the description herein.

Turning to the flight planning system 302 in more detail, it may include one or more processors 310, which may have a particular type or architecture, chosen as appropriate for particular implementations. The processors 310 may couple to one or more bus systems 312 that are chosen for compatibility with the processors 310.

The flight planning systems 302 may include one or more instances of computer-readable storage media 314, which couple to the bus systems 312. The bus systems may enable the processors 310 to read code and/or data to/from the computer-readable storage media 314. The media 314 may represent storage elements implemented using any suitable technology, including but not limited to semiconductors, magnetic materials, optics, or the like. The media 314 may include memory components, whether classified as RAM, ROM, flash, or other types, and may also represent hard disk drives.

The storage media 314 may include one or more modules 316 of instructions that, when loaded into the processor 310 and executed, cause the system 302 to provide flight plan computation services for a variety of UAVs 318. These modules may implement the various algorithms and models described and illustrated herein.

The UAVs 318 may be of any convenient size and/or type as appropriate for different applications. In different scenarios, the UAVs may range from relatively small drones to relatively large transport aircraft. Accordingly, the graphical illustration of the UAV 318 as shown in FIG. 3 is representative only, and is not drawn to scale.

The flight plan services 316 may generate respective flight plan solutions 320 for the UAVs 318 based on inputs 322, with flight planning personnel 324 and/or one or more databases 326 providing inputs 322.

Assuming that the flight plan services 316 define one or more solutions 320, the flight planning system 302 may load the solutions into the UAVs 318, as represented by the arrow connecting blocks 302 and 318 in FIG. 3. In addition, the flight planning system 302 may also provide the solutions 320 to the flight planner 324 and/or the databases 326, as denoted by the arrow 320A.

Figure 4B:
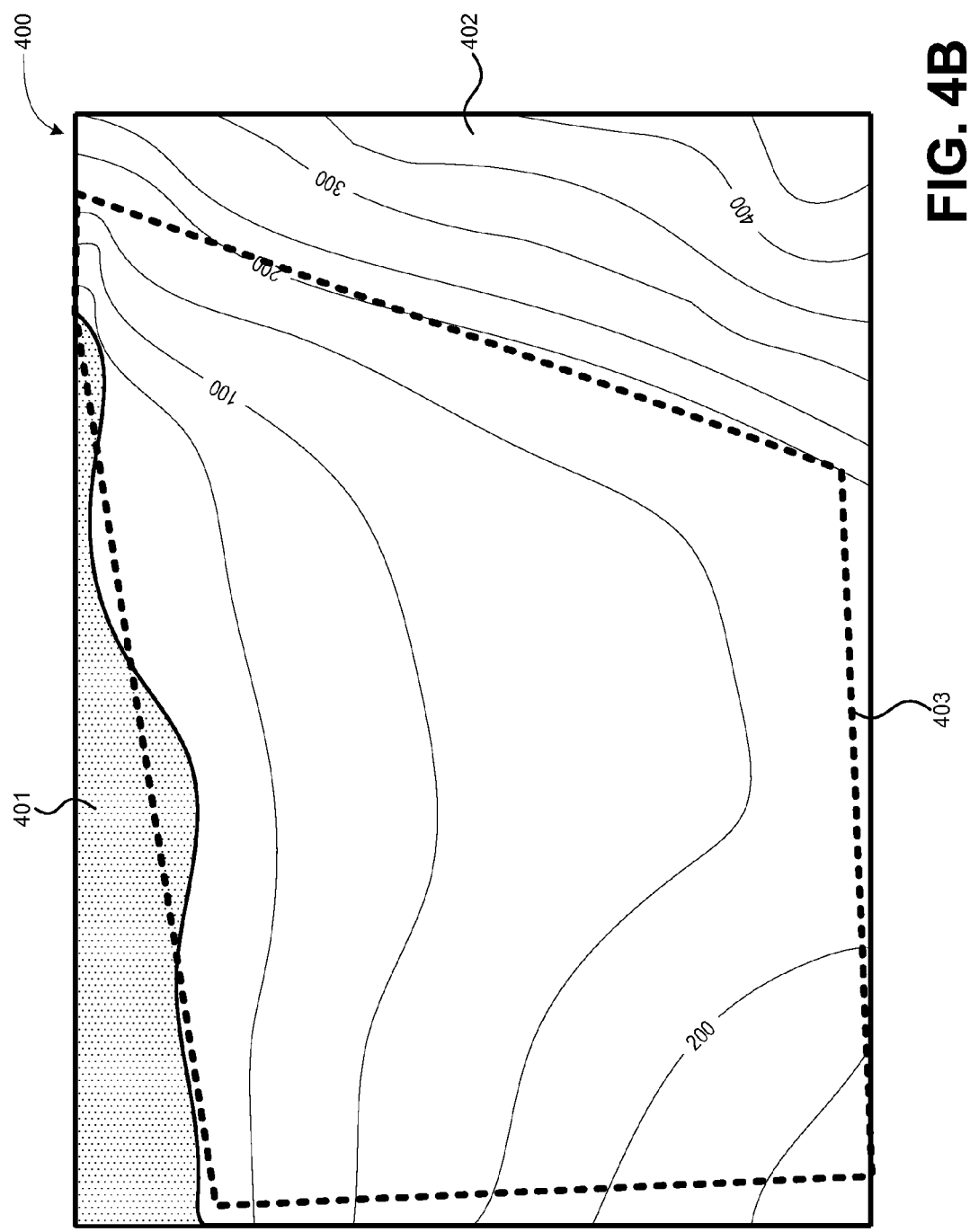

FIGS. 4A-4F depict an example of steps of generating a search flight path for a UAV. FIG. 4A depicts a display of a topographical map 400. The topographical map 400 includes a depiction of a body of water 401 and land 402. FIG. 4B depicts the same topographical map 400. FIG. 4B also depicts a search area boundary 403. The search area boundary 403 can be entered into a control system by a UAV controller. For example, if the topographical map 400 is depicted on a touchscreen display of the control system, a UAV controller can enter the search area boundary 403 by drawing the search area boundary on the touchscreen over the topographical map. The search area boundary 403 can also be entered into a control system in a number of other ways, such as by entering coordinates of the corners of the search area boundary 403, by entering headings and distances of each of the sides of the search area boundary 403, and the like. After the search area boundary 403 has been entered into the control system, the control system can display the search area boundary 403 on the topographical map 400, as shown in FIG. 4B. This listing of claims will replace all prior versions and listings of claims in the application.

Figure 4C:
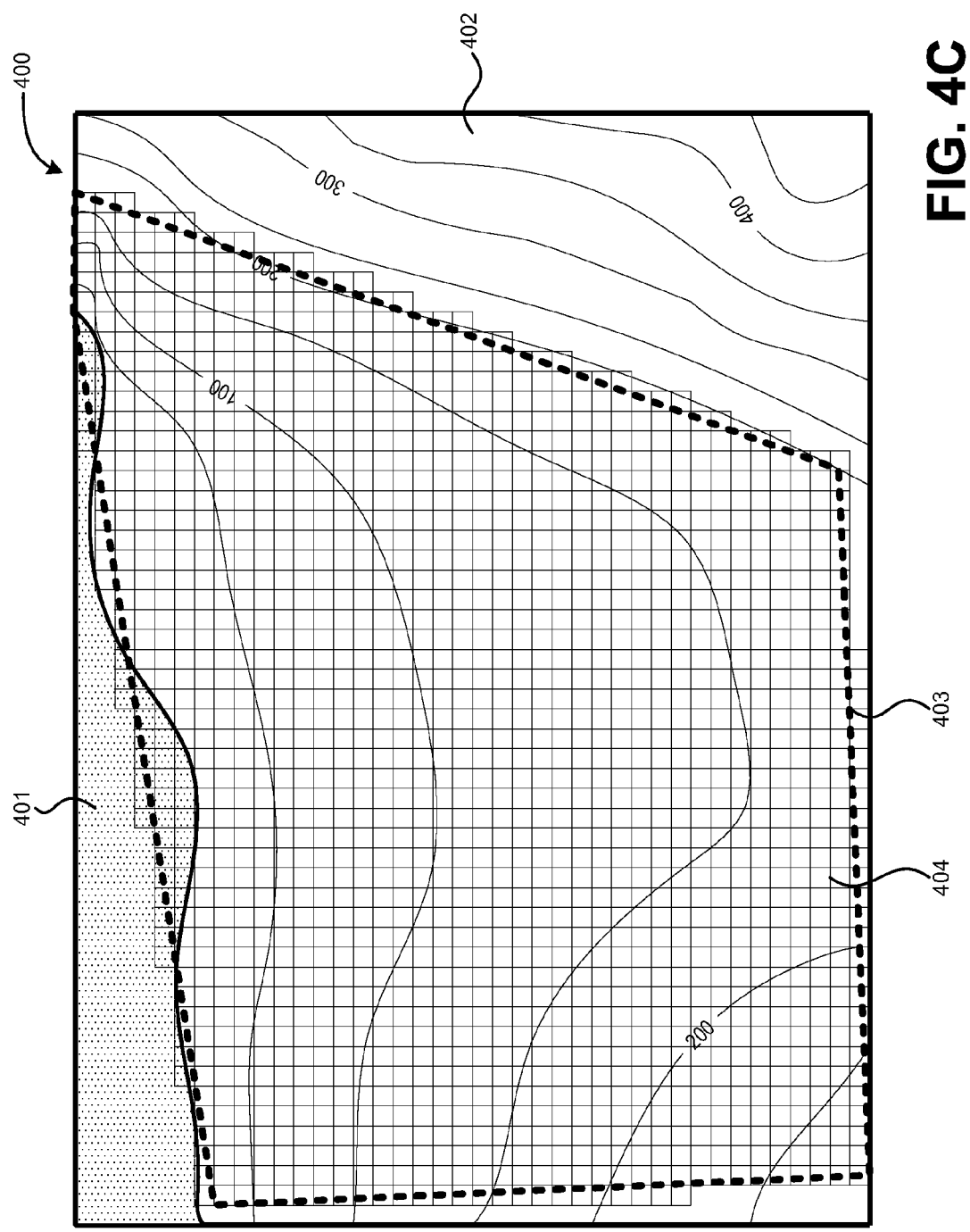

FIG. 4C depicts the topographical map 400 overlayed with the search area boundary 403. FIG. 4C also depicts search regions 404. The control system can determine the size and shape of the search regions 404. The size and shape of the search regions 404 can be based on one or more of a size of a particular target of a search, based on a shape of the particular object of a search, based on a size and shape of the search area boundary 403, and the like. In the depiction shown in FIG. 4C, the search regions 404 can include a number of square regions. The search regions 404 could also take the form of other shapes, such as triangles, rectangles, pentagons, hexagons, and the like. As is also shown in FIG. 4C, the search regions 404 can cover the entire area bounded by the search area boundary 403. Portions of the search regions 404 can fall outside of the search area boundary 403. The depicted search regions can be part of a target probability map, which is described in greater detail below.

In addition to entering the search area boundary 403 into a control system, a UAV controller can also enter an indication of a search pattern into the control system. Examples of search patterns are depicted in FIGS. 5A-5E.

Figure 5A:
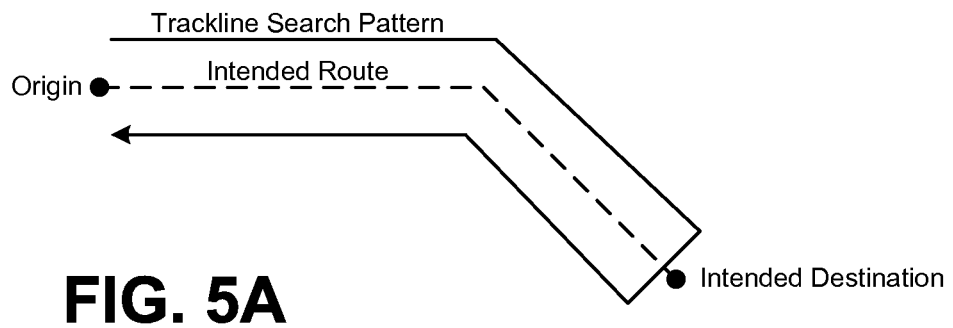
FIGS. 5A-5E depict examples of search patterns.

FIG. 5A depicts an example of a trackline search pattern. A trackline search pattern typically is used when a search target's intended route is known. This search pattern is usually the first search action since it is assumed that the target is near the intended route. In FIG. 5A, the origin, the intended route, and the intended destination are depicted, along with a trackline search pattern.

Figure 5B:
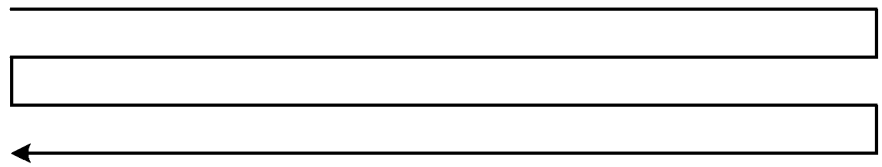

FIG. 5B depicts an example of a parallel search pattern. A parallel search pattern can be used when a search area is large and the probability of the target being anywhere in the search area is substantially the same. The search legs generally run parallel to the longer side of the search area.

Figure 5C:
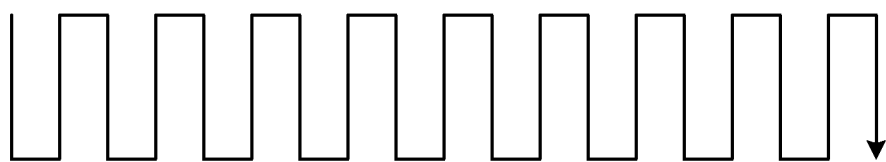

FIG. 5C depicts an example of a creeping line search pattern. A creeping line search pattern is typically used when the search area is large, uniform coverage is desired, and there is more chance of the target being in one end of the search area than the other. The search legs generally run parallel to the shorter side of the search area.

Figure 5D:
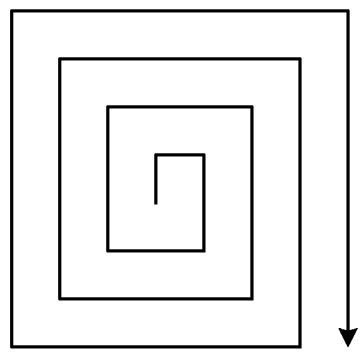

FIG. 5D depicts an example of an expanding square search pattern. An expanding square search pattern is used when a central location for a start point is known and uniform coverage is desired. The direction of the first leg can be determined based on an desired direction. All turns are at substantially right angles.

Figure 5E:
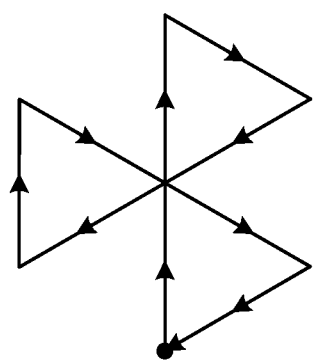

FIG. 5E depicts an example of a sector search pattern. A sector search pattern is typically used when a search target is difficult to detect. The pattern resembles the spokes of a wheel, with the center of the wheel at datum point. The search vehicle passes through the datum point several times, each time increasing the chances of finding the target. A sector search pattern can include turns of approximately 60°, with the search pattern defining nine substantially equal legs, each leg having a length substantially equal to the radius of the search area.

In addition to those search patterns depicted in FIGS. 5A-5E, many other possible search patterns are possible. When entering the search pattern, the UAV controller can select one search pattern from a list possible search patterns, the UAV controller can type in a name of the search pattern, the UAV controller can draw an approximation of the search pattern on a map, and the UAV controller can enter the search pattern in any other way.

Figure 4D:
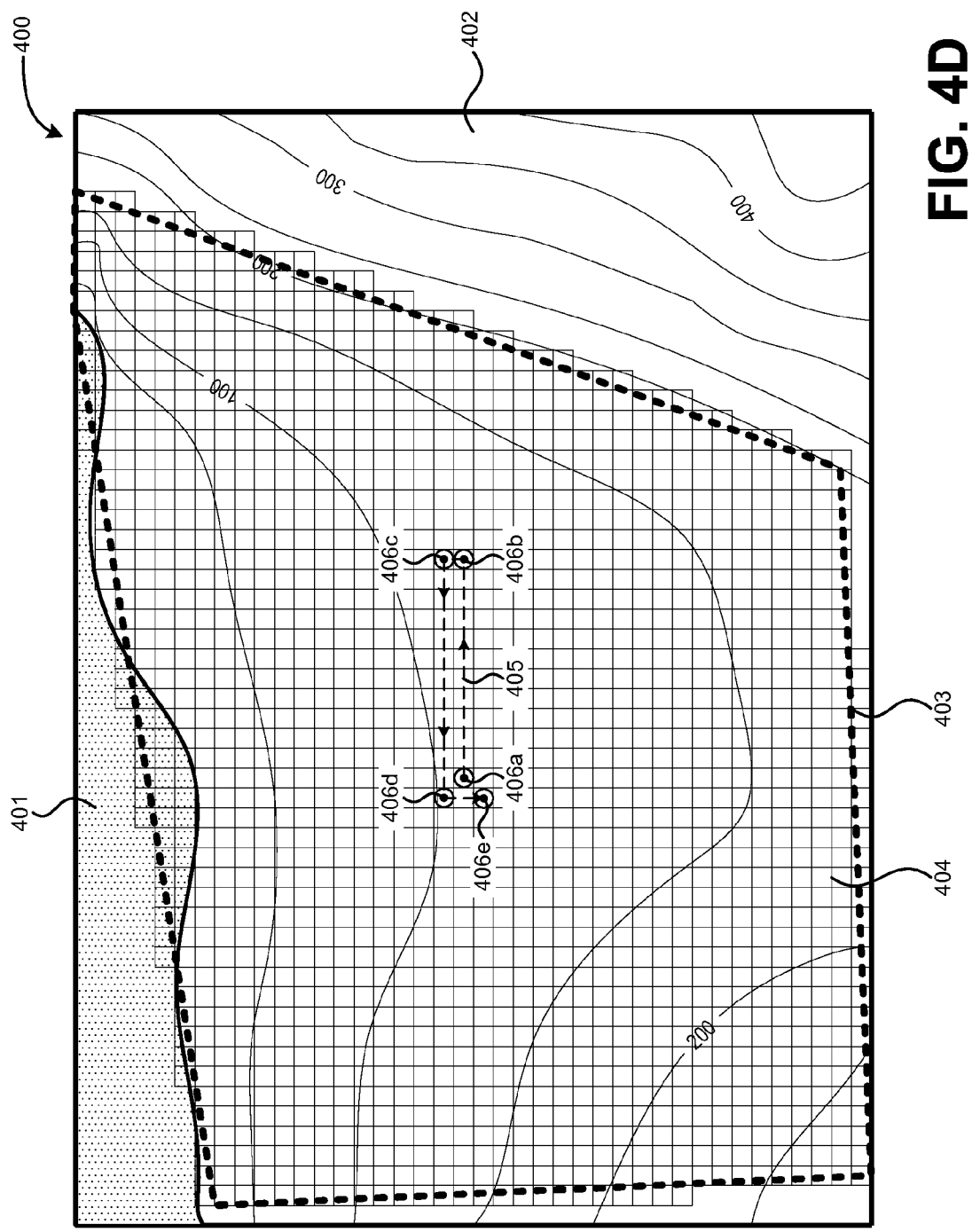

FIG. 4D depicts a flight path 405 overlayed on a display of a map. A UAV controller may have entered an expanding rectangle tracking pattern. In this case, the control system can determine the flight path 405 based on the search area boundary 403 and the search pattern specified by the UAV controller. The flight path 405 can be defined by a plurality of waypoints 406. For example, the control system may determine that the search flight path 405 should start at waypoint 406a, continue to waypoint 406b, and then on to waypoints 406c, 406d, and 406e. The first waypoint 406a can be based on a location that will allow for the selected search pattern to be completed, based on an estimated or expected location of the target, based on a user input of a particular start location, and the like. The control system can also determine an initial direction to start the search pattern or the control system can receive an input from a UAV controller indicative of a search pattern direction. The control system's determination of the flight path 405 can be based on the received indication of the pattern direction. The control system can transmit an indication of the flight path 405 to the UAV while in flight. The control system can transmit the flight path 405 to the UAV by transmitting indications of the waypoints 406 to the UAV.

Each of the waypoints 406 depicted in FIG. 4D is located inside one of the search regions 404 and much of the flight path 405 follows along the middle of the search regions 404. However, the waypoint 406 do not necessarily need to be located in the middle search regions 404 and the flight path 405 does not necessarily need to follow along the middle of the search regions 404.

Figure 4E:
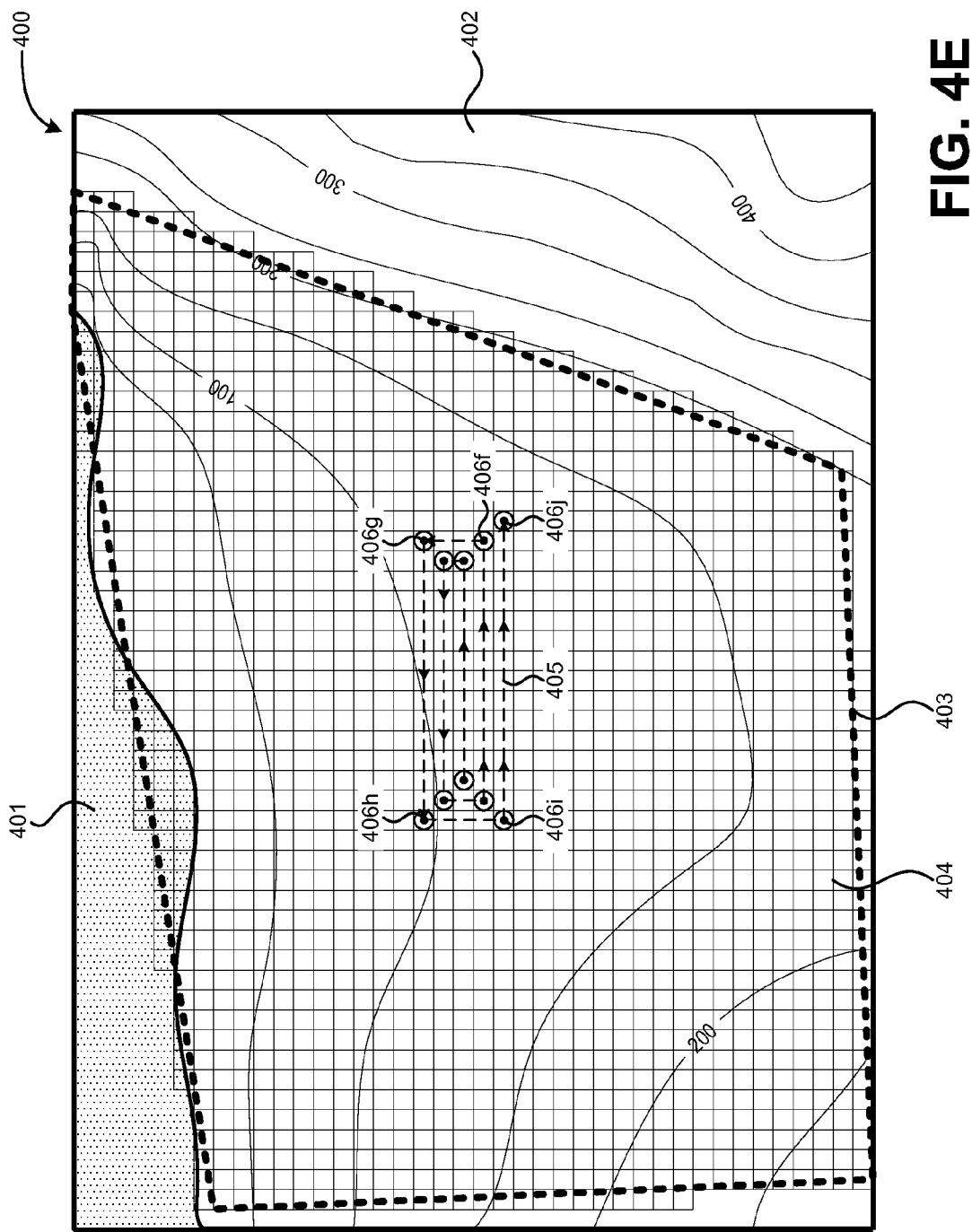
Figure 4F:
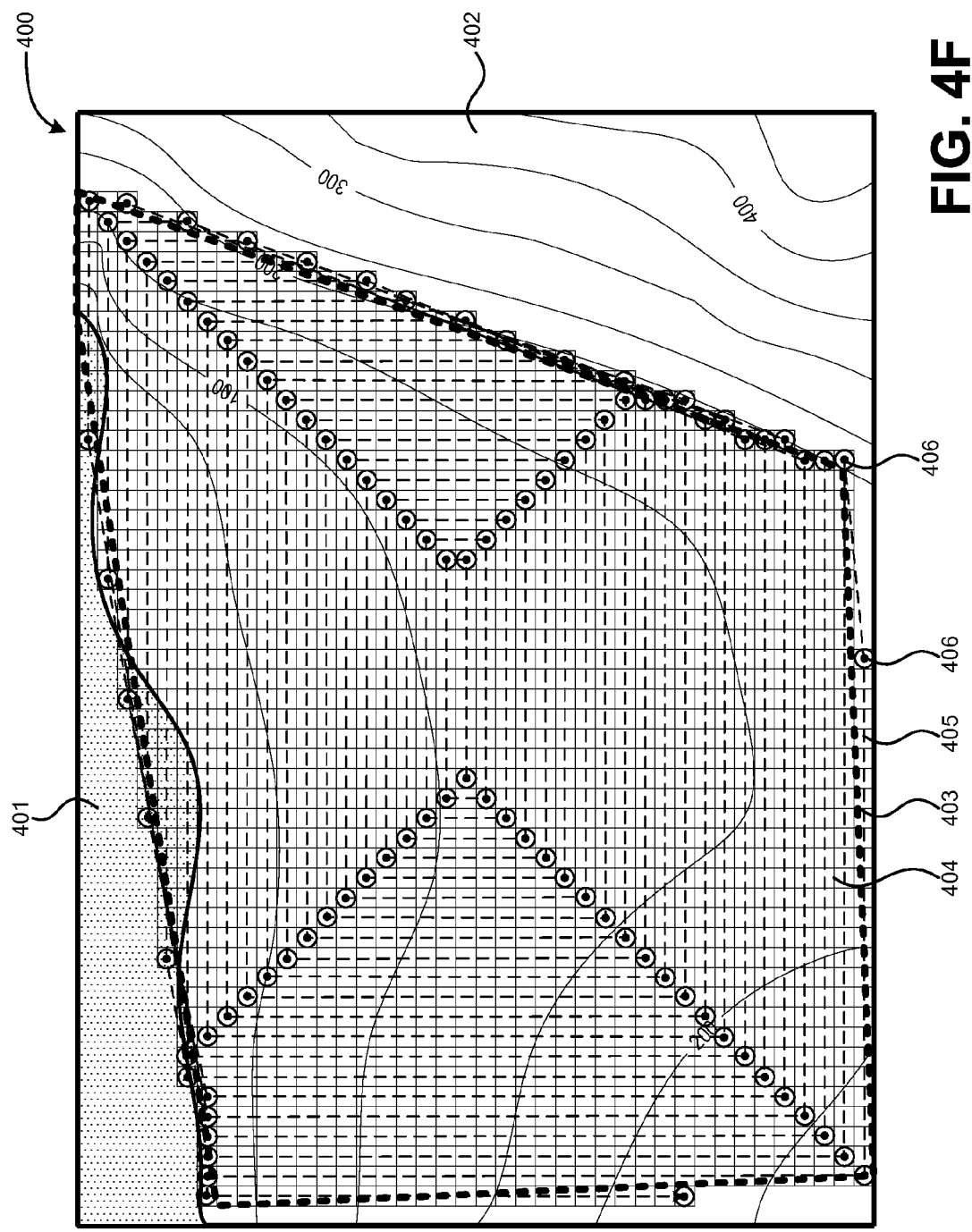

FIG. 4E depicts additional portions of the flight path 405. The after passing through the waypoints 406a-406e, the UAV can pass through waypoints 406f-406j. The control system can determine the waypoints 406f-406j and transmit indications of the waypoints 406f-406j to the UAV. In one example, all of the waypoints 406 can be transmitted to the UAV in a single transmission. In another example, particular subsets of the waypoints 406 can be transmitted to the UAV, such as a first transmission of the waypoints 406a-406e followed by a second transmission of the waypoints 406f-406j. In this latter example, the passing of waypoints 406 to the UAV in separate subsets can reduce the amount of communication to the UAV that would occur at any given time. For example, a control system can transmit indications of waypoints 406a-406e to the UAV and, while the UAV is flying between waypoint 406a and waypoint 406e, the control system can then transmit indications of waypoints 406*f*-406*j*. This pattern of transmitting subset of waypoints 406 to the UAV while the UAV is completing a portion of the flight path 405 defined by the previous subset of waypoint can be continued until the UAV has completed the entire flight path 405. FIG. 4F depicts a full flight path 405 and corresponding waypoint 406 for a UAV to fully fly through the search area boundary 403. All of the waypoints 406 have not been labeled for convenience.

After the flight path 405 has been determined, the UAV controller may update selections about the search. The UAV controller may change the selected search pattern, a track spacing of the search pattern, or other selections that may affect the flight path 405 of the search. In such a case, the control system can update the flight path and display the updated flight path overlayed on the map display.

Figure 6:
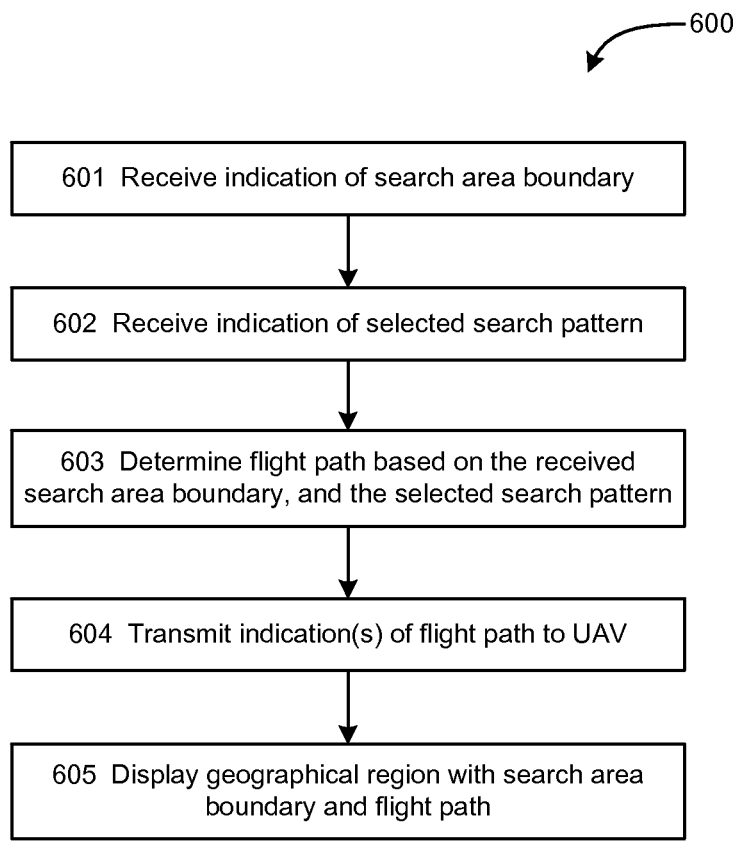
FIG. 6 depicts an example of a method 600 including steps of generating a search flight path for a UAV by a control system.

FIG. 6 depicts an example of a method 600 including steps of generating a search flight path for a UAV by a control system. At block 601, the control system can receive an indication of a search area from a UAV controller. As discussed above, the indication of the search area can be a drawing of a search area boundary on a map, an indication of a number of coordinates, an indication of a number of directions and lengths of sides of a search area boundary, and the like. At block 602, the control system can receive an indication of a search pattern. For example, a UAV controller can select one search pattern from a plurality of available search patterns. At block 603, the control system can determine a flight path based on the received search area boundary and the selected search pattern. The determined flight path can be represented by a plurality of waypoints. At block 604, the control system can transmit one or more indications of the flight path to the UAV. As discussed above, all of the one or more indications of the flight path can be transmitted to the UAV in a single transmission. Similarly, different indications of the flight path can be transmitted to the UAV in a single transmission can be transmitted to the UAV at different times. For example, one or more individual subsets of a plurality of waypoints can be transmitted the UAV while the UAV is flying along a portion of the flight path. At block, 605, the control system can display a map with an indication of the search area boundary and the flight path. If the flight path is updated, the control system can display the updated flight path.

In addition to displaying the map in block 605, the control system can also display search regions within the search area boundary. The size and number of the search regions be based on a number of factors. For example, the size and number of the search regions can be based on the size of the search area boundary. In another example the size and number of the search regions can be determined so as to cover the entire area bounded by the search area boundary. The determination of the search regions can include a determination of a search region shape. The search region shape can be any shape, such as a triangle, a rectangle, a square, a pentagon, a hexagon, and the like.

The method 600 depicted in FIG. 6 can provide a number of benefits. For example, the method 600 can allow a control system to create a search flight path for a search area boundary based on two inputs by a UAV controller: an indication of the search area boundary and an indication of the selected search pattern. After entering those two inputs into a control system, the UAV controller can be free to focus attention to other aspects of controlling the UAV. Moreover, the control system can employ resources that may not be able to be employed by a controller. For example, the control system can employ an optimization function to minimize an amount of fuel used by the UAV to search the entire search area boundary. Other advantages are also possible.

Figure 7A:
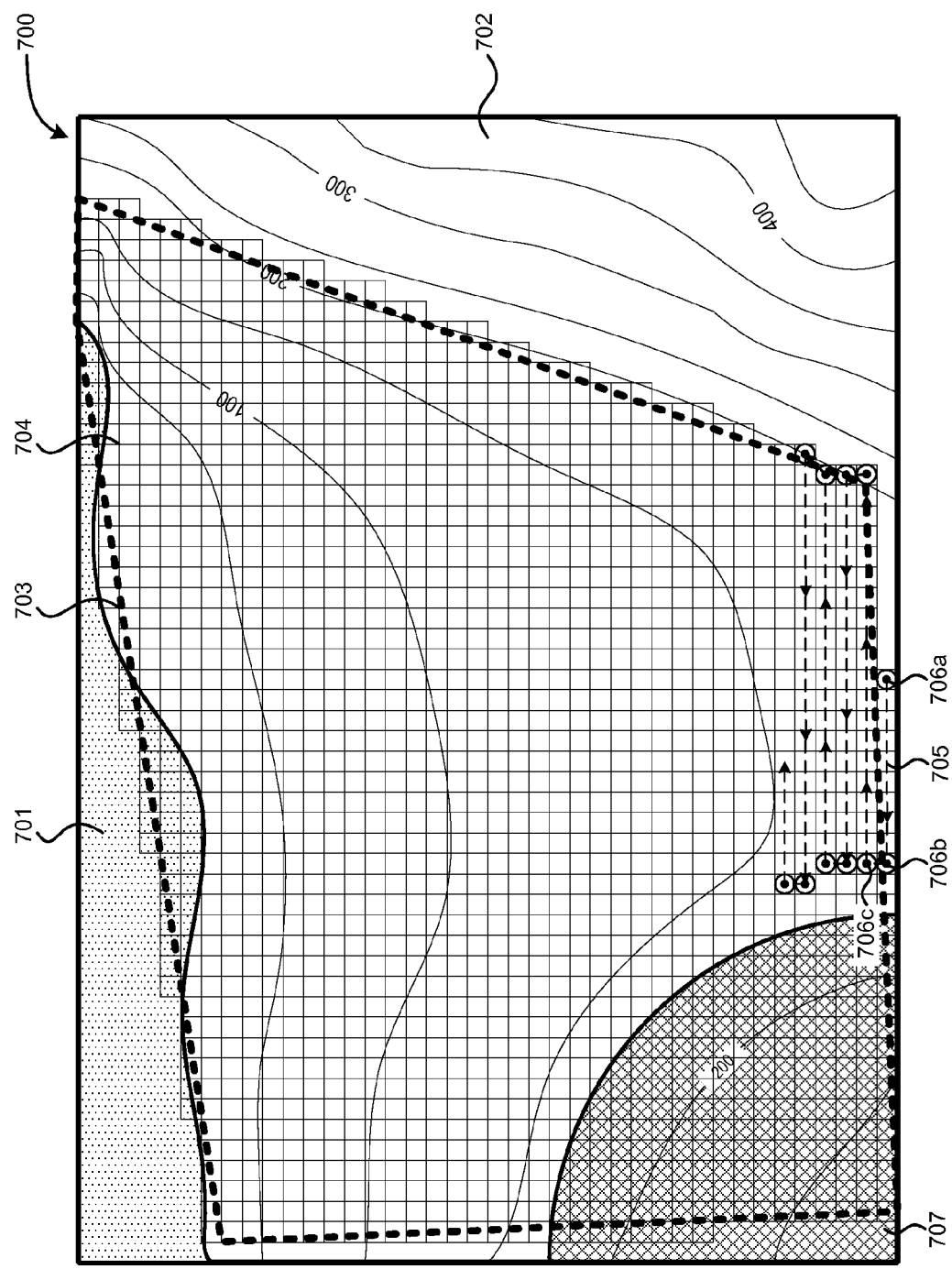
FIGS. 7A and 7B depict an example of a search flight path generated for UAV to search a search area that includes a no-fly zone.

FIG. 7A depicts an example of a search flight path generated for UAV to search a search area that includes a no-fly zone. FIG. 7A depicts a topographical map 700 that includes an indication of a body of water 701 and an indication of land 702. FIG. 7A also depicts a search area boundary 703 and search regions 704. FIG. 7A further depicts a flight path 705. The flight path 705 can be defined by a plurality of waypoints 706, some of which are labeled as 706*a*, 706*b*, and 706*c*. FIG. 7A also depicts a no-fly zone 707. The no-fly zone 707 can be an area where the UAV should not fly and/or is not permitted to fly. A number of factors may be used to determine whether a no-fly zone 707 is located in the search area boundary 703. For example, the land under the no-fly zone 707 may contain terrain that may make it difficult or dangerous for the UAV to fly, such as a mountain, a butte, a hill, tall buildings, and the like. In another example, the no-fly zone 707 may be located in restricted air space, such as airspace near an airport, airspace located near or in a militarized area, and the like.

As described above, a control system can determine the flight path 705 based on inputs of the search area boundary 703 and a selected search pattern. The control system can also determine the flight path 705 such that the UAV will not enter the no-fly zone 707. The control system can define no-fly zones, such as no-fly zone 707, as a particular shape, such as a circular shape, a polygonal shape, a convex polygonal shape, and the like. The control system can take into account specifications of the UAV in determining the flight path 705 such that the UAV avoids the no-fly zone 707.

Figure 7B:
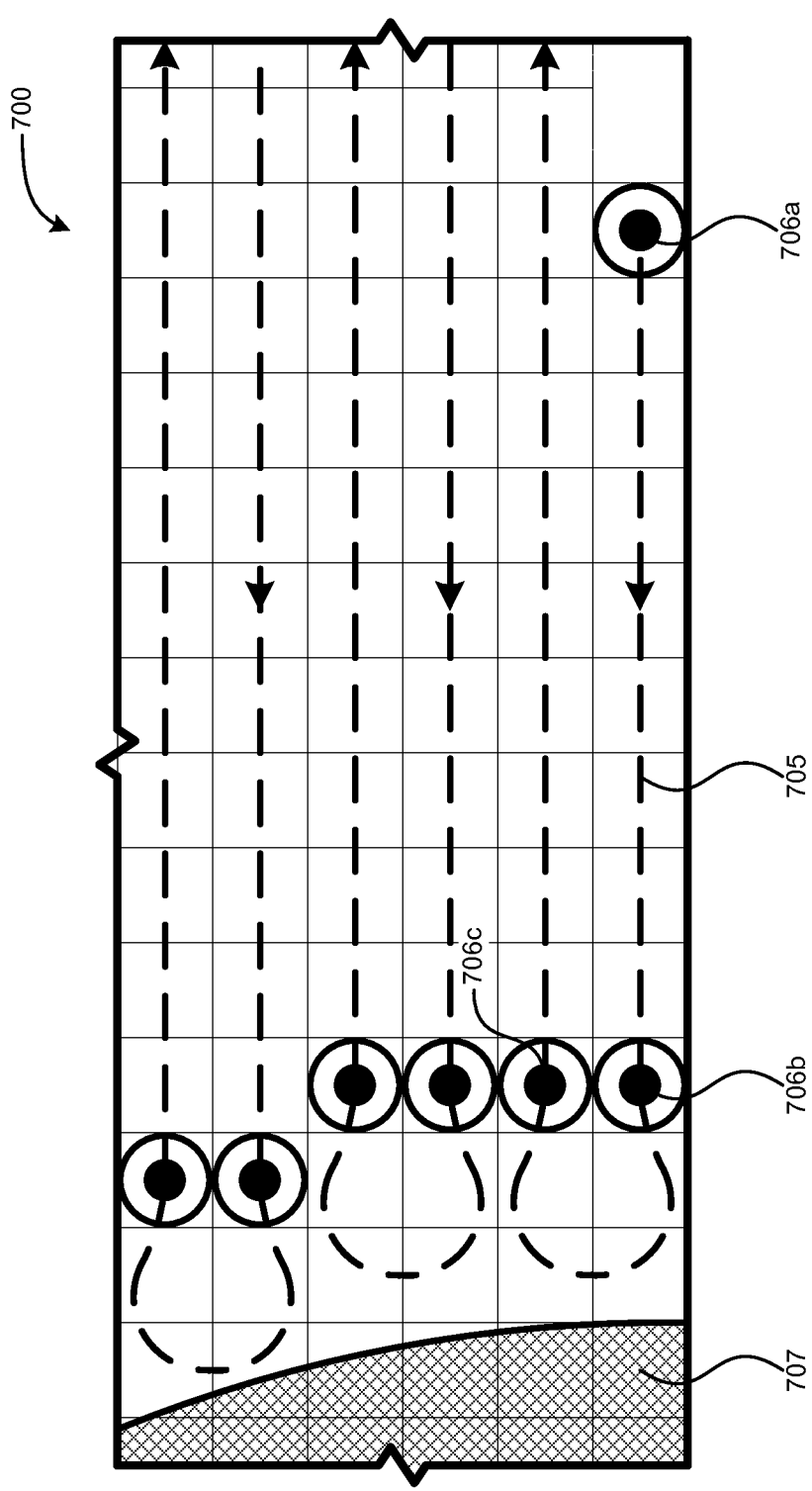

In one example, the control system can take into account a minimum turn radius of a UAV when creating the flight path 705. Referring to FIG. 7A, the waypoint 706*b* is not located in the search region immediately next to the no-fly zone 707. The location of waypoint 706*b* may be determined such that, based on the minimum turn rate of the UAV, the UAV can fly from the waypoint 706*b* to the waypoint 706*c* without entering the no-fly zone 707. FIG. 7B depicts a portion of the topographical map 700 showing a closer view of waypoints 706*a*-706*c*. In the flight path 705 between waypoint 706*b* and waypoint 706*c*, the flight path 705 makes several turns, keeping within the minimum turn rate of the UAV, to avoid the no-fly zone 707.

The control system can also determine the flight path 705 such that the UAV will pass near the edges of no-fly zone 707 a number of times or for a length of time such that a camera or sensor on the UAV can inspect some or all of the no-fly zone 707 without the UAV entering the airspace of the no-fly zone. Inspecting the no-fly zone 707 without the UAV entering the airspace of the no-fly zone can be accomplished with the aid of a camera and/or sensor mounted to a slewing mechanism on the UAV.

Figure 8:
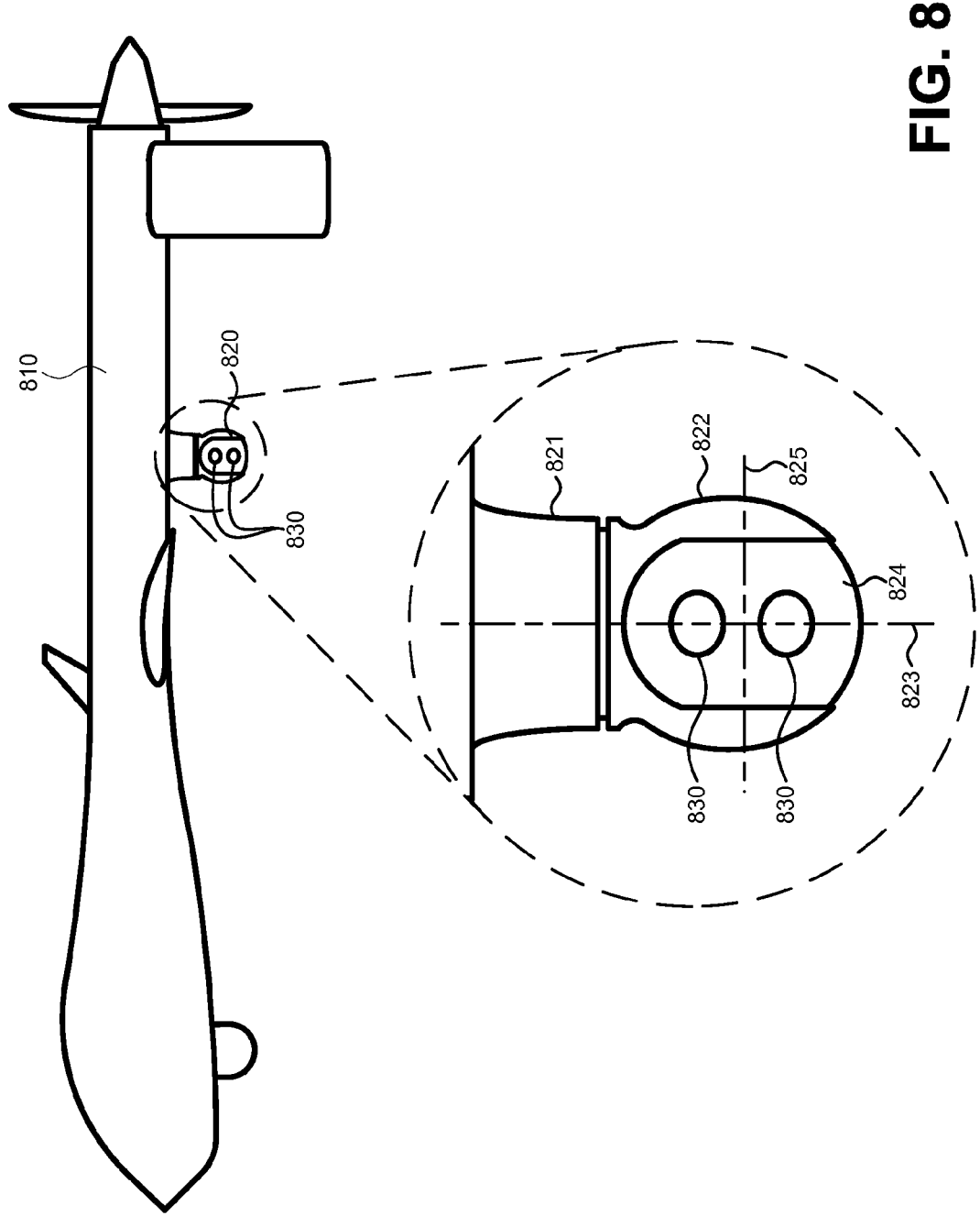
FIG. 8 depicts a slewing mechanism mounted to a UAV.

FIG. 8 depicts a slewing mechanism 820 mounted to a UAV 810. The slewing mechanism can have mounted thereto one or more sensors 830. The one or more sensors 830 can include one or more imaging sensors, such as a camera, an infrared sensor, an electro-optical/infrared (EO/IR) camera, and the like. The one or more sensors 830 can also include one or more other types of sensors, such as an electromagnetic spectrum sensor, a gamma ray sensor, a biological sensor, a chemical sensor, and the like.

The slewing mechanism can be configured to rotate about one or more axes to position the one or more sensors 830 within a range of different angles. In the particular example shown in FIG. 8, the slewing mechanism 820 can include a base portion 821 and an outer rotating portion 822. The outer rotating portion 822 can be configured to rotate with respect to the base portion 821 about an axis 823. The slewing mechanism can include a motor or actuator and a control unit to rotate the outer rotating portion 822 with respect to the base portion 821 about the axis 823 to particular angles. The slewing mechanism 820 can also include an inner rotating portion 824. The inner rotating portion 824 can be configured to rotate with respect to the outer rotating portion 822 about an axis 825. The slewing mechanism can include a motor or actuator and a control unit to rotate the inner rotating portion 824 with respect to the outer rotating portion 822 about the axis 825 to particular angles. The one or more sensors 830 can be mounted to the inner rotating portion 824. In this way, the one or more one or more sensors 830 can be directed in a wide range of directions.

As a UAV is flying along a search flight path, a control unit can be configured to direct the one or more sensors 830 to observe particular locations below the UAV. The control unit can control the movements of the slewing mechanism 820 to direct the one or more sensors 830 in appropriate directions to observe the particular locations. The control unit can include one or more algorithms the intelligently and autonomously direct the one or more sensors 830 to observe particular locations.

One example of an algorithm for directing the one or more sensors 830 to observe particular locations is a route scan algorithm. A route scan algorithm observes locations along and near the route of the UAV. For example, while a UAV is flying over a particular search region, the control unit can direct the one or more sensors 830 to observe the search region directly under the UAV. Observing the search region directly under the UAV can include moving the directing the one or more sensors 830 to the right and left of the UAV in order to observe an entire search region along the route. In another example, the algorithm can take into account vehicle geometry (such as locations of propellers, direction, of travel, and the like) when directing the one or more sensors 830.

Another example of an algorithm for directing the one or more sensors 830 to observe particular locations is an optimization algorithm. An optimization algorithm may determine to direct the one or more sensors 830 to a portion of a search area based on a potential benefit of searching that portion of the search area. It may be determined that such an area is relatively close to the UAV or relatively far from the UAV. The determination of an area to search can be based on a probability that a search target is or is not located within a particular search region. Such a probability can be determined based on a target probability map, as discussed below with respect to FIG. 9. The determination of an area to search can also be based on the geometry of the UAV and the location of the slewing mechanism 820. For example, if a camera was directed directly toward a propeller of the UAV, the resulting image may be an image of the propeller which would not be useful in a search of the area. Taking into account the geometry of the UAV can prevent wasted search time. The slewing mechanism may also have a limited range of motion and may not be able to direct the camera in particular directions. Taking into account any geometric limitations of the slewing mechanism can prevent attempt to direct the sensors in a direction that the slewing mechanism cannot turn. The determination of an area to search can also be based on the existence of a no-fly zone. For example, it may be advantageous to direct a sensor to search a search region under a no-fly zone any time that the UAV is located near the edges of a no-fly zone. The determination of an area to search can also be based on the existence of a no-look zone. A no-look zone may be a zone where sensitive operations occur at particular times, such as exercises occurring on a military base, during which images should not be taken. Taking into account a no-look zone can prevent an unauthorized party from intercepting images of sensitive operations transmitted from a UAV to a control system. The determination of an area to search can also be based on image quality considerations. For example frequent and/or fast movements of the slewing mechanism may cause jitter in the images and/or video taken by the camera and sent back to the control system, and make it difficult for a user to view the images and/or video taken by the camera. Similarly, frequent zooming of the camera can make it difficult for a user to view images and/or video taken by the camera.

Regardless of the algorithm used to direct the one or more sensors 830, after the one or more sensors 830 complete an observation of a particular location, a new observation location can be selected using the algorithm. The control unit that controls the direction of the one or more sensors 830 can be located in either a ground-based control system used by UAV controller or onboard a UAV itself. In either case, the control unit can control the one or more sensors 830 during the search, freeing the UAV controller to focus on other aspects of controlling the UAV and/or interpreting the results of the search.

The one or more sensors 830 can include a camera and a sensor. The sensor can be configured to determine where the camera should be directed and an appropriate zoom for the camera. The camera can be configured to focus on and take images of the search regions. In one example, the sensor can be configured to identify a portion of a search region before the camera is rotated toward and focused on the portion of the search region. The sensor can obtain information such as an orientation and a distance to the portion of the search region, and the control of the slewing mechanism 820 and the camera can be based on the information obtained by the sensor. In this way, the sensor can be detecting potential target search regions ahead of the time that the camera is taking images of the search regions. A control unit of the slewing mechanism can be configured to receive the sensor signals and control the slewing mechanism based on the sensor signals.

Figure 9:
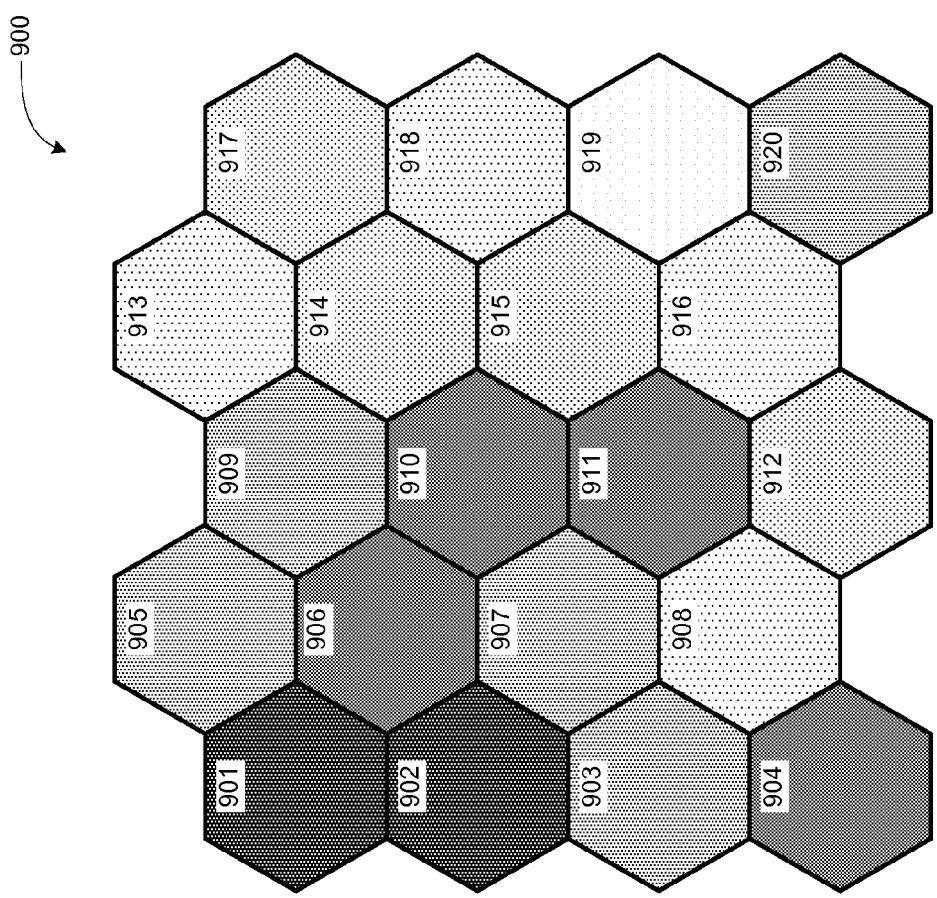
FIG. 9 depicts an example of a target probability map.

While a UAV is performing a search, a target probability map can be created. A target probability map can include a number of search regions and an indication of a probability whether a search target is or is not located in each of the search regions. FIG. 9 depicts an example of a target probability map 900. The target probability map includes a number of hexagonal-shaped search regions 901-920. While the search regions 901-920 depicted in the target probability map 900 of FIG. 9 happen to be in the shape of hexagons, search regions in a target probability map can be of any shape or size. Each of the search regions 901-920 can include one or more indications of a probability that the target is not located in that particular search region. For example, the search regions 901-920 have various levels of shading: search region 919 has no shading; search regions 908, 913, 916, and 918 have the lightest form of shading; search regions 912, 914, 915, and 917 have the next darker level of shading; search regions 903, 905, 907, 909, and 920 have the next darker level of shading; search regions 904, 906, 910, and 911 have the next darker level of shading; and search regions 901 and 902 have the darkest level of shading. The darker the level of shading of a search region can indicate the greater the likelihood that the search target is not located in that search region. For example, the darkest level of shading in search regions 901 and 902 can indicate a high likelihood that the search target is not located in search regions 901 and 902.

Variations of the target probability map 900 depicted in FIG. 9 are possible. For example, while the indications of probability in target probability map 900 are shown in terms of shading, other indicators of probability could be used. Probabilities in a target probability map could be indicated using a variety of colors (e.g., a heat map), numerical indications of percentages, and the like. In another example, the target probability map 900 could be overlayed on a depiction of a search area, such as a map of the search area, an overhead view of the search area, and the like. If the target probability map 900 is overlayed on a map of a search area and darker shading in the search regions indicates less of a likelihood that the search target is in the area, then the shading will tend to obscure those portions of the map that are less likely to contain the search target and then shading will tend to leave exposed those portions of the map that are more likely to contain the search target.

The probability that a search target is located in a particular search region can be based on one or more of a number of factors. One probability factor can be the number of times that a UAV has flown over the search area. For example, in the case of the flight path 405 depicted in FIG. 4F, the flight path 405 would take the UAV over the right side of the search area boundary 403 many times. Likewise, the flight path 405 would take the UAV over the top side of the search area boundary 403 many times. While the UAV flies over the search regions on the right and tops sides of search area boundary 403 many times, it can conduct further searches of those areas. The probability that the search target is located in the search regions on the right and top sides of the search area boundary 403 could be lower after being searched many times than in the search regions in the center of the search area boundary 403, along the lower side of search area boundary 403, and along the bottom side of the search area boundary 403.

Another probability factor can be based on information about the terrain in the search area. For example, if the terrain in a search region limits visibility—such as in the case of an area with many trees and/or tall buildings—a search of the search region may not substantially reduce the probability that the search target is not in the search area. Conversely, if a search region has terrain with no visibility issues—such as a body of calm water, a beach area, and the like—a search of the search region may substantially reduce the probability that the search target is not in the search area. Other terrain issues, such as a steepness of the terrain, the color of the terrain, and any other condition of the terrain, can be taken into account.

Another probability factor can be based on information about conditions in the search region at the time that a search was conducted. For example, if a search region was searched on a cloudless day with no wind, the probability that a search target would be in the search region after a search may be lower. In another example, if a search region was searched at a time of limited visibility—such as when clouds or fog were present, when snow was on the ground, and the like—the probability that a search target would be in the search region after a search may be higher. Any other information about the conditions of a search region at the time that a search was conducted can be taken into account.

Another probability factor can be based on information about the search target itself. For example, if the search target is mobile—such as in the case of a lost hiker or lifeboat on a body of water—the search target may move into a search region that was previously searched. Thus, the probability that the search target in not located in a particular search region can decrease with time from the last search of the search region. Conversely, if the search target is not mobile—such as in the case of wreckage of a crashed aircraft or a disabled land vehicle—the probability that the search target in not located in a particular search region may not change with time from the last search of the search region. In another example, if a search target is likely to seek shelter—such as in the case of a lost hiker or injured animal—the search of a search region with many locations for shelter may not substantially reduce the probability that the search target is located within a particular search area.

When a target probability map is created, it can be used in a number of ways. For example, a UAV controller may use a target probability map to redraw a search area boundary. Referring back to FIG. 4F, after the UAV completes the flight path 405, each of the search regions 404 could indicate a probability (e.g., by being shaded) to form a target probability map. For example, since the flight path 405 follows along the right side and top side of the search boundary area 403 a number of times, the search regions 404 can show a higher probability that the search target is not located along the right and top sides of the search area boundary 403. Similarly, others of the search regions 404, such as those near the bottom side and left side of the search area boundary 403, can show a lower probability that the search target is not located along the left and bottom sides of the search area boundary 403. In this case, the UAV controller can draw a new area boundary map that does not include all of the search regions along the right and top sides of the search area boundary 403. In another example, a control system can use the target probability map to determine a flight path for a search. Referring again to FIG. 4F, once a UAV has completed a search by flying along the flight path 405, a control system can determine a new flight path for a second search. The control system can determine to start the new flight path in a different location (e.g., closer to the lower left hand corner of the search area boundary 403) so that the search occurs where the target probability map indicates a lower likelihood that the search target is not in the search region where the new flight path will start.

Figure 10:
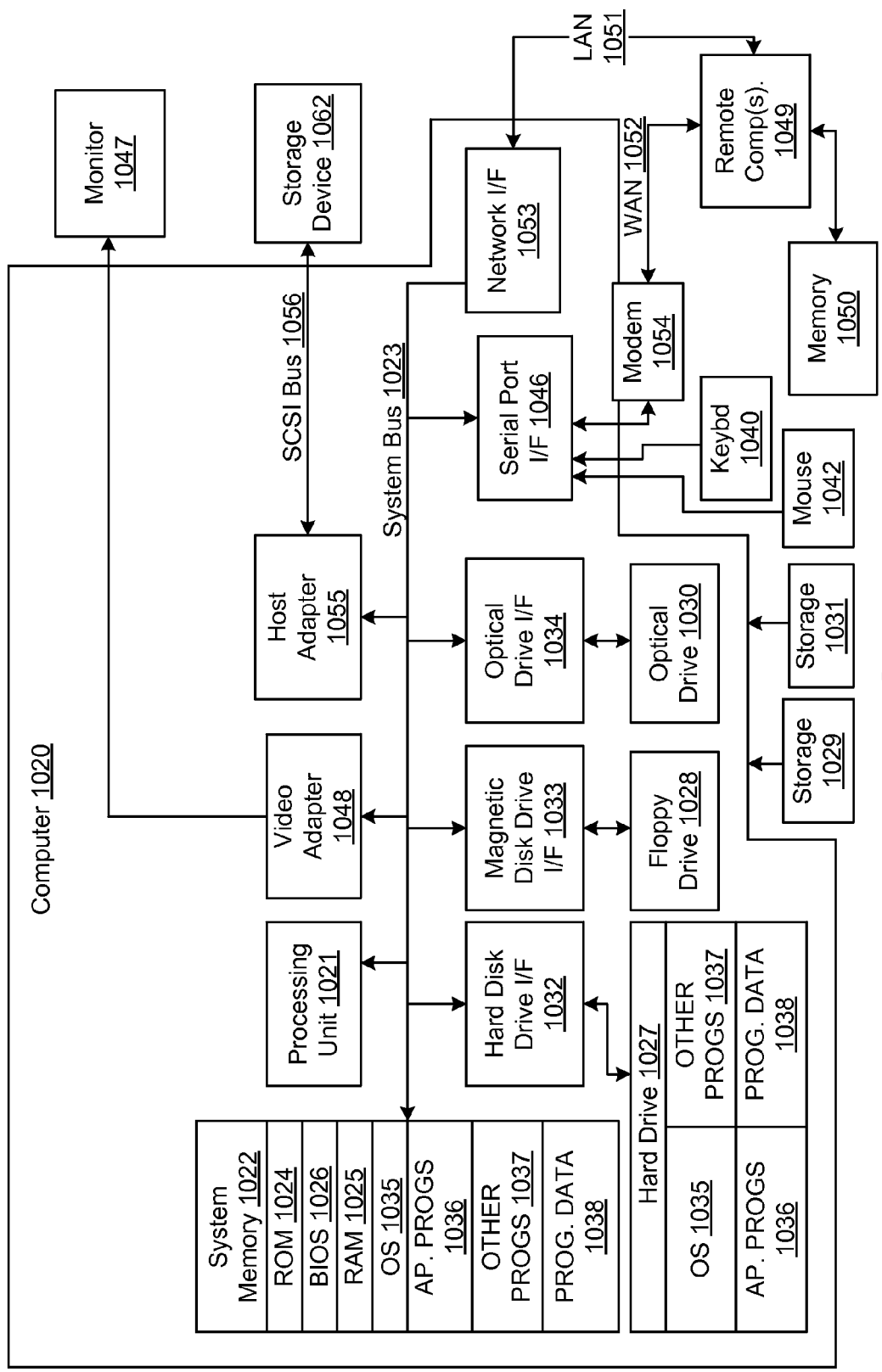
FIG. 10 depicts an illustration of an example computing environment in which operations according to the disclosed subject matter may be performed.

FIG. 10 and the following discussion are intended to provide a brief general description of a suitable computing environment in which the methods and systems disclosed herein and/or portions thereof may be implemented. For example, the functions of server 304, laptop 306, desktop 308, flight planning system 302, and database 326 may be performed by one or more devices that include some or all of the aspects described in regard to FIG. 10. Some or all of the devices described in FIG. 10 that may be used to perform functions of the claimed examples may be configured in other devices and systems such as those described herein. Alternatively, some or all of the devices described in FIG. 10 may be included in any device, combination of devices, or any system that performs any aspect of a disclosed example.

Although not required, the methods and systems disclosed herein may be described in the general context of computer-executable instructions, such as program modules, being executed by a computer, such as a client workstation, server or personal computer. Such computer-executable instructions may be stored on any type of computer-readable storage device that is not a transient signal per se. Generally, program modules include routines, programs, objects, components, data structures and the like that perform particular tasks or implement particular abstract data types. Moreover, it should be appreciated that the methods and systems disclosed herein and/or portions thereof may be practiced with other computer system configurations, including handheld devices, multi-processor systems, microprocessor-based or programmable consumer electronics, network PCs, minicomputers, mainframe computers and the like. The methods and systems disclosed herein may also be practiced in distributed computing environments where tasks are performed by remote processing devices that are linked through a communications network. In a distributed computing environment, program modules may be located in both local and remote memory storage devices.

FIG. 10 is a block diagram representing a general purpose computer system in which aspects of the methods and systems disclosed herein and/or portions thereof may be incorporated. As shown, the exemplary general purpose computing system includes computer 1020 or the like, including processing unit 1021, system memory 1022, and system bus 1023 that couples various system components including the system memory to processing unit 1021. System bus 1023 may be any of several types of bus structures including a memory bus or memory controller, a peripheral bus, and a local bus using any of a variety of bus architectures. The system memory may include read-only memory (ROM) 1024 and random access memory (RAM) 1025. Basic input/output system 1026 (BIOS), which may contain the basic routines that help to transfer information between elements within computer 1020, such as during start-up, may be stored in ROM 1024.

Computer 1020 may further include hard disk drive 1027 for reading from and writing to a hard disk (not shown), magnetic disk drive 1028 for reading from or writing to removable magnetic disk 1029, and/or optical disk drive 1030 for reading from or writing to removable optical disk 1031 such as a CD-ROM or other optical media. Hard disk drive 1027, magnetic disk drive 1028, and optical disk drive 1030 may be connected to system bus 1023 by hard disk drive interface 1032, magnetic disk drive interface 1033, and optical drive interface 1034, respectively. The drives and their associated computer-readable media provide non-volatile storage of computer-readable instructions, data structures, program modules and other data for computer 1020.

Although the example environment described herein employs a hard disk, removable magnetic disk 1029, and removable optical disk 1031, it should be appreciated that other types of computer-readable media that can store data that is accessible by a computer may also be used in the exemplary operating environment. Such other types of media include, but are not limited to, a magnetic cassette, a flash memory card, a digital video or versatile disk, a Bernoulli cartridge, a random access memory (RAM), a read-only memory (ROM), and the like.

A number of program modules may be stored on hard disk drive 1027, magnetic disk 1029, optical disk 1031, ROM 1024, and/or RAM 1025, including an operating system 1035, one or more application programs 1036, other program modules 1037 and program data 1038. A user may enter commands and information into the computer 1020 through input devices such as a keyboard 1040 and pointing device 1042. Other input devices (not shown) may include a microphone, joystick, game pad, satellite disk, scanner, or the like. These and other input devices are often connected to the processing unit 1021 through a serial port interface 1046 that is coupled to the system bus, but may be connected by other interfaces, such as a parallel port, game port, or universal serial bus (USB). A monitor 1047 or other type of display device may also be connected to the system bus 1023 via an interface, such as a video adapter 448. In addition to the monitor 1047, a computer may include other peripheral output devices (not shown), such as speakers and printers. The exemplary system of FIG. 10 may also include host adapter 1055, Small Computer System Interface (SCSI) bus 1056, and external storage device 1062 that may be connected to the SCSI bus 1056.

The computer 1020 may operate in a networked environment using logical and/or physical connections to one or more remote computers or devices, such as remote computer 1049, that may represent any of server 304, laptop 306, desktop 308, flight planning system 302, and database 326. Each of server 304, laptop 306, desktop 308, flight planning system 302, and database 326 may be any device as described herein capable of performing the determination and display of zero fuel time data and return to base time data. Remote computer 1049 may be a personal computer, a server, a router, a network PC, a peer device or other common network node, and may include many or all of the elements described above relative to the computer 1020, although only a memory storage device 1050 has been illustrated in FIG. 10. The logical connections depicted in FIG. 10 may include local area network (LAN) 1051 and wide area network (WAN) 1052. Such networking environments are commonplace in police and military facilities, offices, enterprise-wide computer networks, intranets, and the Internet.

When used in a LAN networking environment, computer 1020 may be connected to LAN 1051 through network interface or adapter 1053. When used in a WAN networking environment, computer 1020 may include modem 1054 or other means for establishing communications over wide area network 1052, such as the Internet. Modem 1054, which may be internal or external, may be connected to system bus 1023 via serial port interface 1046. In a networked environment, program modules depicted relative to computer 1020, or portions thereof, may be stored in a remote memory storage device. It will be appreciated that the network connections shown are exemplary and other means of establishing a communications link between computers may be used.

Computer 1020 may include a variety of computer-readable storage media. Computer-readable storage media can be any available tangible, non-transitory, or non-propagating media that can be accessed by computer 1020 and includes both volatile and nonvolatile media, removable and non-removable media. By way of example, and not limitation, computer-readable media may comprise computer storage media and communication media. Computer storage media include volatile and nonvolatile, removable and non-removable media implemented in any method or technology for storage of information such as computer-readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium that can be used to store the desired information and that can be accessed by computer 1020. Combinations of any of the above should also be included within the scope of computer-readable media that may be used to store source code for implementing the methods and systems described herein. Any combination of the features or elements disclosed herein may be used in one or more examples.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

In general, the various features and processes described above may be used independently of one another, or may be combined in different ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. The example systems and components described herein may be configured differently than described. For example, elements may be added to, removed from, or rearranged compared to the disclosed examples.

While certain example or illustrative examples have been described, these examples have been presented by way of example only, and are not intended to limit the scope of the inventions disclosed herein. Indeed, the novel methods and systems described herein may be embodied in a variety of other forms. The accompanying claims and their equivalents are intended to cover such forms or modifications as would fall within the scope and spirit of certain of the inventions disclosed herein.

What is claimed is:

1. A method of planning a flight path for a search, the method comprising:
   receiving, by a control system, an indication of a search area boundary;
   receiving, by the control system, an indication of a selected search pattern;
   determining, by the control system, the flight path based on the search area boundary, the selected search pattern, and an optimization algorithm, the optimization algorithm configured to direct the search to search regions within the search area boundary based on a likelihood that a search target is located within the search regions, wherein the likelihood is based on a number of times the search has been performed in the search regions and terrain of the search regions; and
   transmitting one or more indications of the flight path to an unmanned aerial vehicle.

2. The method of claim 1, wherein the selected search pattern comprises at least one of a trackline search pattern, a parallel search pattern, a creeping line search pattern, an expanding square search pattern, and a sector search pattern.

3. The method of claim 1, further comprising:
   receiving a pattern direction;
   wherein determining the flight path comprises determining the flight path based further on the pattern direction.

4. The method of claim 1, further comprising:
   displaying the flight path on a display of a map.

5. The method of claim 4, further comprising:
   receiving, by the control system, an update of one or more of the selected search pattern or track spacing of the selected search pattern; and
   updating the displayed flight path on the display of the map.

6. A system for displaying target search probabilities, the system comprising:
   a control unit configured to determine, based on an optimization algorithm, a search area to be searched, the optimization algorithm configured to direct a search to search regions within a search area boundary based on a likelihood that a search target is located within the search regions, wherein the likelihood is based on a number of times the search has been performed in the search regions and terrain of the search regions;
   a sensor mounted on an air vehicle, the sensor configured to determine a direction and a distance to the search area; and
   a camera mounted on the air vehicle, the camera configured to take one or more images of the search area;
   wherein the control unit is further configured to:
   receive, from the sensor, an indication of the direction and the distance to the search area, and
   control an orientation and a zoom of the camera based on the indication of the direction and the distance to the search area received from the sensor.

7. The system of claim 6, further comprising:
   a display configured to display the search regions and to display, in one or more of the search regions, an indication of the likelihood that the search target is located in each of the one or more of the search regions.

8. The system of claim 7, wherein the indication of the likelihood that the search target is located in each of the search regions comprises one or more of a shading of the one or more of the search regions, a color of the one or more of the search regions, and a numerical indicator in the one or more of the search regions.

9. A method of planning a flight path for a search, the method comprising:
   receiving, by a control system, an indication of a search area boundary;
   receiving, by the control system, an indication of a selected search pattern;
   identifying a no-fly zone, wherein at least a portion of the no-fly zone overlaps at least a portion of the search area boundary;
   determining, by the control system, the flight path based on the search area boundary, the selected search pattern, the no-fly zone, an optimization algorithm, and at least one specification of an unmanned aerial vehicle, the optimization algorithm configured to direct the search to search regions within the search area boundary based on a likelihood that a search target is located within the search regions, wherein the likelihood is based on a number of times the search has been performed in the search regions and terrain of the search regions; and transmitting one or more indications of the flight path to the unmanned aerial vehicle.

10. The method of claim 9, further comprising: displaying the flight path on a display of a map.

11. The method of claim 9, wherein the no-fly zone is defined as a polygon.

12. The method of claim 9, wherein the flight path is determined such that the unmanned aerial vehicle searches portions of the search area boundary that are outside of the no-fly zone.

13. The method of claim 9, wherein the specification of the unmanned aerial vehicle comprises a minimum turn radius.

14. The method of claim 9, wherein the control system is configured to automatically determine the flight path.

15. The method of claim 14, wherein the control system is further configured to automatically determine the flight path at least partially simultaneously while a controller of the unmanned aerial vehicle is controlling another aspect of the unmanned aerial vehicle.

16. A system comprising:
   an unmanned aerial vehicle configured to fly over one of a plurality of search areas;
   a slewing mechanism mounted on the unmanned aerial vehicle;
   a control unit configured to determine one search area from the plurality of search areas to be searched based on an optimization algorithm and to control the slewing mechanism based on the determination of the one search area to be searched, the optimization algorithm configured to a search to search regions within a search area boundary based on a likelihood that a search target is located within the search regions, wherein the likelihood is based on a number of times the search has been performed in the search regions and terrain of the search regions; and
   a camera mounted on the slewing mechanism, wherein the camera is configured to take one or more images of the one search area to be searched.

17. The system of claim 16, wherein the control unit is further configured to determine the one search area based on a location of the unmanned aerial vehicle.

18. The system of claim 16, wherein the control unit is further configured to determine the one search area based on a location of a no-fly zone with respect to the unmanned aerial vehicle.

19. The system of claim 16, wherein the control unit is further configured to determine the one search area based on at least one specification of the unmanned aerial vehicle.

* * * * *